No. 736,172. PATENTED AUG. 11, 1903.
M. W. TALEN, C. F. PEARSON, E. B. CHRISTOPHER,
G. E. JOHNSON & L. A. LINDBERG.
VEHICLE DRIVING GEAR.
APPLICATION FILED OCT. 30, 1902.
NO MODEL. 2 SHEETS—SHEET 1.

WITNESSES:
Robert Head
Isaac B. Owens.

INVENTORS
Maurice W. Talen
Carl F. Pearson
Erick B. Christopher
Gustaf E. Johnson
Lars A. Lindberg

BY
ATTORNEYS.

No. 736,172. Patented August 11, 1903.

UNITED STATES PATENT OFFICE.

MAURICE W. TALEN, CARL F. PEARSON, ERICK B. CHRISTOPHER, GUSTAF E. JOHNSON, AND LARS A. LINDBERG, OF CHICAGO, ILLINOIS.

VEHICLE DRIVING-GEAR.

SPECIFICATION forming part of Letters Patent No. 736,172, dated August 11, 1903.

Application filed October 30, 1902. Serial No. 129,404. (No model.)

*To all whom it may concern:*

Be it known that we, MAURICE W. TALEN, CARL F. PEARSON, ERICK B. CHRISTOPHER, and GUSTAF E. JOHNSON, citizens of the United States, and LARS A. LINDBERG, a subject of the King of Sweden and Norway, all residents of Chicago, in the county of Cook and State of Illinois, have invented a new and Improved Vehicle Driving-Gear, of which the following is a full, clear, and exact description.

This invention is intended particularly for use on automobiles, and relates to certain novel features residing in a speed-change transmission-gear of the sun-and-planet type and in a novel construction by which this gear is combined with a differential gearing in such a manner as to form, as will be hereinafter fully set forth, a concrete gearing serving the two functions referred to.

This specification is an exact description of one form of our invention, while the claims define the actual scope thereof.

Reference is to be had to the accompanying drawings, forming a part of this specification, in which similar characters of reference indicate corresponding parts in all the views.

Figure 1:
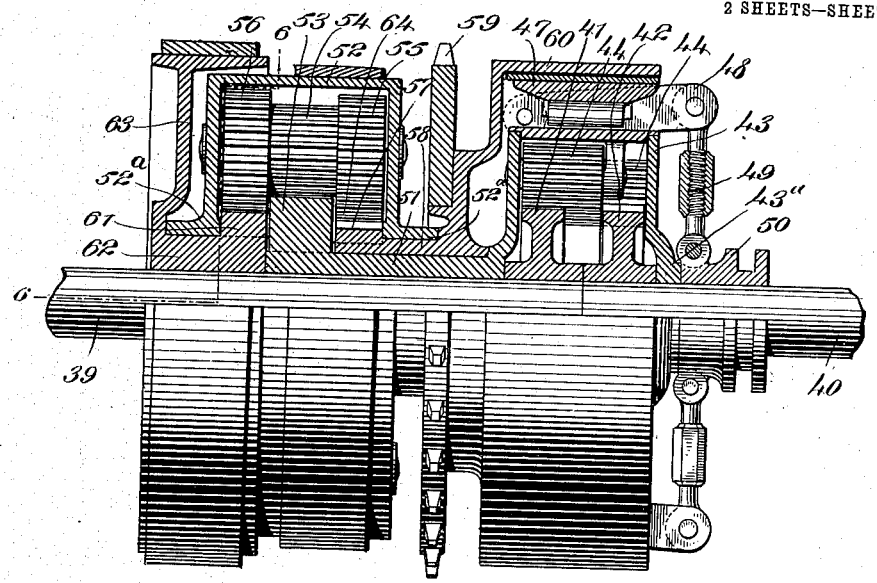
Figure 2:
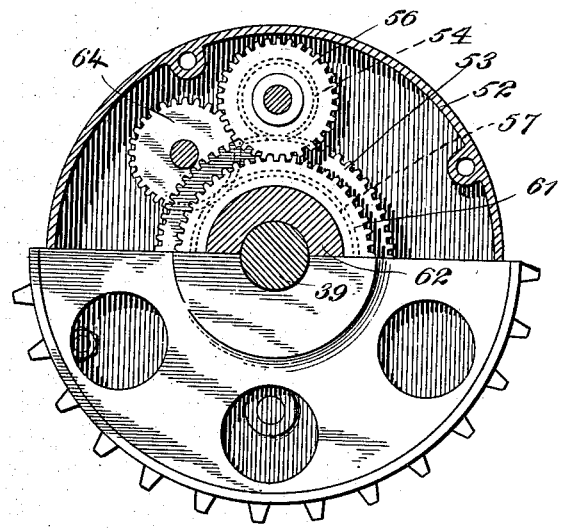
Figure 3:
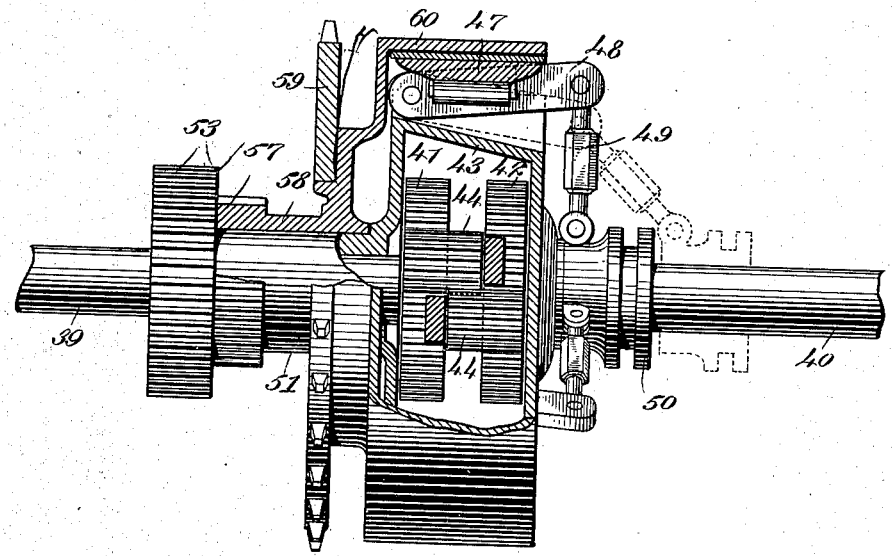
Figure 4:
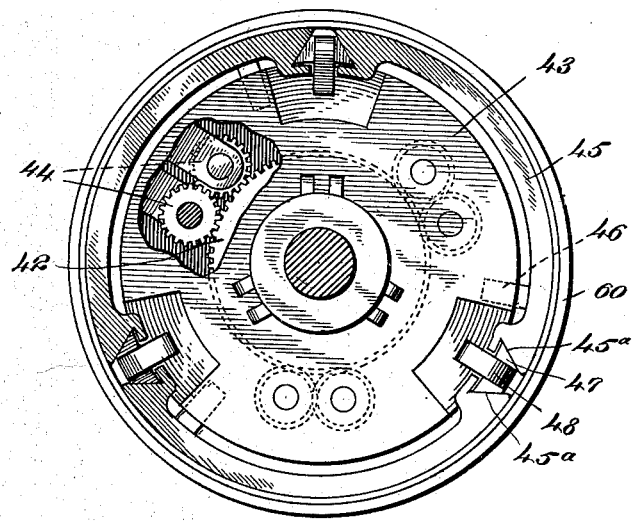

Figure 1 is a sectional elevation of the combined transmission and differential gear, showing it applied to a divided axle. Fig. 2 is a section on the line 6 6 of Fig. 1. Fig. 3 is a fragmentary view showing the differential gear and part of the transmission-gear; and Fig. 4 is an outer end elevation of the clutch, as shown in Fig. 3.

39 and 40 represent, respectively, the two parts of the divided driving-axle or other divided element to be driven. To these parts are respectively fastened the spur-gears 41 and 42 of the differential gear. These gears are inclosed in a case 43, in which are mounted the intermeshed pinions 44, these pinions being also meshed, respectively, with the gears 41 and 42. The gear-case 43 carries the inner clutch member, which is arranged to turn with the gear-case and which comprises the segmental shoes 45. These shoes each have studs 46 at one end, said studs being fastened in the gear-case 43, whereby to mount the shoes. The opposing ends of the shoes have beveled faces $45^a$, and between these faces work the wedges 47, said wedges being carried on levers 48, connected by links 49 with the collar 50, this collar being loose on the axle-section 40, so as to move independently thereof. The right-hand hub $43^a$ of the gear-case 43 is loosely mounted on the axle-section 40, and the left-hand end carries a sleeve 51, which loosely encircles the axle-section 39 and to which is attached a gear 53. On said sleeve 51, between the gear 53 and the case 43, is mounted a sleeve 58, to which is attached the driving sprocket-wheel 59, and said sleeve is extended outwardly and laterally to form a circular clutch member 60, inclosing the shoes 45 and coacting therewith to form the complete clutch. The sleeve 58 is loose on the sleeve 51, and said sleeve 58 carries a gear 57, lying alongside of the gear 53. Lying at the opposite side of the gear 53 and loose on the shaft-section 39 is a gear 61, fastened to a sleeve 62, and said sleeve carrying a brake-wheel 63, to which a strap-brake or other means for retarding the revolution of the parts 63, 62, and 61 is applied. 52 indicates a gear-case which incloses the gears 57, 53, and 61 and which has its hubs $52^a$ bearing, respectively, on the sleeve 58 and on the sleeve 62. In said gear-case 52 are three connected planetary gears 56, 54, and 55. Of these gears the gear 56 meshes with the gear 61, the gear 54 meshes with the gear 53, and the gear 55 meshes with an intermediate gear 64, (see Fig. 2,) said intermediate gear 64 in turn meshing with the gear 57. The gearing as thus organized provides for high and low speed ahead and a reverse movement. High speed is attained by throwing in the clutch, so that the case 43 is in rigid connection with the driving sprocket-wheel 59. Transmission is then direct, and the gears 44 and 41, acting with the divided axle, allow for the difference in movement of the two axle-sections, as will be understood. To obtain low speed ahead, the brake-band should be tightened on the wheel 63, thus arresting the gear 61. The driving-gear 57, acting through the gears 64 and 55, will cause the planetary gears and their case to roll around the then stationary gear 61, and owing to the ratio between the gears 54 and 53 the sleeve 51 will be driven in the same direction as the gear 57, but at a lower speed. To reverse the direction of movement, the brake-wheel 63 should be released, thus causing the gear elements 61 and 56 to become idle. Then upon arresting the gear-case 52 the sleeve 51 will be driven reversely to the gear 57 through the medium of the gears 64, 55, 52, and 53. At all adjustments of the gearing the movement is transmitted to the axle through the medium of the differential-gear case 43, and consequently the divided axle is at all times subject to the operation of the differential gear.

Various changes in the form, proportions, and minor details of our invention may be resorted to at will without departing from the spirit and scope thereof. Hence we consider ourselves entitled to all such variations as may lie within the intent of our claims.

Having thus described our invention, we claim as new and desire to secure by Letters Patent—

1. The combination with the two-part driven member, of a gear attached to each part thereof, two intermeshed gears respectively meshed with the first-named gears, a rotatable mounting for the said intermeshed gears, a variable transmission-gearing, a connection between the transmission-gearing and the said mounting, a clutch member attached to said mounting, and a second clutch member connected with the driving element of the transmission-gear.

2. The combination with the two-part driven member, of a gear attached to each part thereof, two intermeshed gears respectively meshed with the first-named gears, a rotatable mounting for the said intermeshed gears, a variable transmission-gearing, a connection between the transmission-gearing and the said mounting, a clutch member attached to the driving element of the transmission-gear, a clutch-shoe working with the clutch member and mounted on said rotatable mounting and having a beveled face, a wedge working against said face, and means for operating the wedge.

3. The combination with a driving element and a two-part driven element, of a differential gearing in connection with said two-part driven element, a gear having connection with the differential gearing, a second gear having connection with the driving element, a loose gear, all three of said gears being axially coincident, means for arresting the movement of the loose gear, three connected planetary gears respectively coacting with the three gears first named, a mounting for the planetary gears, said mounting being revoluble around the axes of the three gears first named, and means for arresting the movement of the mounting.

4. The combination with a driving element and a two-part driven element, of a differential gearing in connection with said two-part driven element, a gear having connection with the differential gearing, a second gear having connection with the driving element, a loose gear, all three of said gears being axially coincident, means for arresting the movement of the loose gear, three connected planetary gears respectively coacting with the three gears first named, a mounting for the planetary gears, said mounting being revoluble around the axes of the three gears first named, means for arresting the movement of, and means for connecting the driving element and the differential gearing to turn as a unit.

5. The combination with the divided driven element, of a differential gearing and case applied thereto, a sleeve in connection with the differential-gear case, a gear attached to said sleeve, said sleeve turning around the axis of the driven element, a driving element turning on the sleeve, a gear in connection with the driving element, a third gear turning around the driven element and loose with respect thereto, means for arresting the movement of the third gear, three connected planetary gears respectively coacting with the three gears first named, a mounting for the planetary gears, said mounting turning around the axis of the driven element, and means for arresting the movement of the mounting.

6. The combination with the divided driven element, of a differential gearing and case applied thereto, a sleeve in connection with the differential-gearing case, a gear attached to said sleeve, said sleeve turning around the axis of the driven element, a driving element turning on the sleeve, a gear in connection with the driving element, a third gear turning around the driven element and loose with respect thereto, means for arresting the movement of the third gear, three connected planetary gears respectively coacting with the three gears first named, a mounting for the planetary gears, said mounting turning around the axis of the driven element, means for arresting the movement of the mounting and means for connecting the driving element and the differential-gear case to turn as a unit.

7. The combination with the divided driven element, of a differential gearing and case applied thereto, a sleeve in connection with the differential-gearing case, a gear attached to said sleeve, said sleeve turning around the axis of the driven element, a driving element turning on the sleeve, a gear in connection with the driving element, a third gear turning around the driven element and loose with respect thereto, means for arresting the movement of the third gear, three connected planetary gears respectively coacting with the three gears first named, a mounting for the planetary gears, said mounting turning around the axis of the driving element, means for arresting the movement of the mounting, a clutch member in connection with the driving element, a clutch member in connection with the differential-gear case, and means for operating the clutch, for the purpose specified.

8. The combination with the two-part driven element, of a gear connected to each part, intermeshed gears respectively meshed with the two gears first named, a gear-case mounting said intermeshed gears, and having a sleeve thereon and a variable transmission mechanism comprising a gear mounted on said sleeve, and a driving element in connection with the said transmission mechanism.

9. The combination with the driving element and a two-part driven element, of a gear fast to each part of the driven element, intermeshed gears respectively meshed with the first-named gears, a rotatable casing in which the intermeshed gears are mounted, a gear having connection with the case, a gear on the driving element, a loose gear, the three last-named gears being axially coincident, means for arresting the movement of the loose gear, three connected planetary gears respectively coacting with the three gears last named, a rotatable mounting for the planetary gears, and means for arresting the movement of the planetary-gear mount.

10. The combination with the driving element and a two-part driven element, of a gear fast to each part of the driven element, intermeshed gears respectively meshed with the first-named gears, a rotatable casing in which the intermeshed gears are mounted, a gear having connection with the case, a gear on the driving element, a loose gear, the three last-named gears being axially coincident, means for arresting the movement of the loose gear, three connected planetary gears respectively coacting with the three gears last named, a rotatable mounting for the planetary gears, means for arresting the movement of the planetary-gear mount, and a clutch having members connected respectively with the differential-gear case and the driving element.

11. The combination with the two-part driven element, of a differential gear in connection therewith, a case for the differential gear, a sleeve in connection with the case and rotatable around the axis of the driven element, a variable transmission-gear comprising a part attached to said sleeve, and means for applying power to the transmission-gear.

12. The combination with the two-part driven element, of a differential gear in connection therewith, a case for the differential gear, a sleeve in connection with the case and rotatable around the axis of the driven element, a variable transmission-gear comprising a part attached to said sleeve, and means for applying power to the transmission-gear, said means comprising a sleeve mounted to rotate around the first-mentioned sleeve and having a driving-gear thereon.

13. The combination with a two-part driven element, of a differential gear in connection therewith, a case for the differential gear, a sleeve in connection with the case and rotatable around the axis of the driven element, a variable transmission-gear comprising a part attached to said sleeve, means for applying power to the transmission-gear, said means comprising a sleeve mounted to rotate around the first-mentioned sleeve and having a driving-gear thereon, said sleeve also having an annular clutch member inclosing the differential-gear case, and a coacting clutch member attached to the gear-case.

14. The combination with the driving and driven elements, of a gear connected to the driving element, a gear connected to the driven element, a loose gear, said gears being axially coincident, three connected planetary gears, a rotatable mounting therefor, two of the planetary gears coacting respectively with the loose gear and the gear on the driven element, an intermediate gear meshed with the third planetary gear and the gear on the driving element, and means for arresting the movement of the loose gear and the said rotatable mounting.

15. The combination with the driving and driven gears, of a loose gear, three connected planetary gears, a rotatable mounting therefor, two of the planetary gears coacting respectively with the loose gear and the driven gear, an intermediate gear meshed with the third planetary gear and the driving-gear, and means for arresting the movement of the loose gear and the said rotatable mounting.

16. The combination of a driving-gear, a driven gear, two connected intermediate gears mounted on an axis adapted to move in an arc around the axis of the driven gear, one of said intermediate gears having connection with the driven gear, an additional gear intermediate to the second of said connected intermediate gears and the driving-gear and meshed therewith, and a controllable means coacting with the driving-gear to impart a circular motion to the axes of the said intermediate and additional gears, for the purpose specified.

17. The combination of a driving-gear, a driven gear, two connected planetary gears one of which is in connection with the driven gear, a rotatable mounting for the planetary gears, means for arresting the movement of the mounting, an intermediate gear carried in said mounting and meshed with the second planetary gear and with the driving-gear and a controllable means coacting with the driving-gear for imparting a rotating movement to the said mounting.

18. The combination with a two-part driven element, of a differential gear attached thereto, a case inclosing said gear and having a sleeve thereon axially coincident to the driven member, a second driving-sleeve turning on the first-named sleeve, variable gearing operating between the two sleeves to drive the first from the second, a circular clutch member attached to the second-named sleeve and inclosing the differential-gear case, and a second clutch member attached to the gear-case and coacting with the first-named gear-case.

In testimony whereof we have signed our names to this specification in the presence of two subscribing witnesses.

MAURICE W. TALEN.
CARL F. PEARSON.
ERICK B. CHRISTOPHER.
GUSTAF E. JOHNSON.
LARS A. LINDBERG.

Witnesses:
ALFRED J. TENGWALD,
FRED ANDERSON.